United States Patent
Gangadarappa

(10) Patent No.: US 12,001,575 B2
(45) Date of Patent: Jun. 4, 2024

(54) AUTOMATED VALIDATION AND SECURITY FOR DIGITAL ASSETS IN A COMPUTER ENVIRONMENT

(71) Applicant: Skyscend, Inc., Atlanta, GA (US)

(72) Inventor: Chayapathy Gangadarappa, Alpharetta, GA (US)

(73) Assignee: SKYSCEND, INC., Atlanta, GA (US)

( * ) Notice: Subject to any disclaimer, the term of this patent is extended or adjusted under 35 U.S.C. 154(b) by 271 days.

(21) Appl. No.: 17/737,180

(22) Filed: May 5, 2022

(65) Prior Publication Data

US 2022/0358231 A1 Nov. 10, 2022

Related U.S. Application Data

(60) Provisional application No. 63/184,214, filed on May 5, 2021.

(51) Int. Cl.
*G06F 21/62* (2013.01)
(52) U.S. Cl.
CPC ................. *G06F 21/6209* (2013.01)
(58) Field of Classification Search
CPC ................................................... G06F 21/6209
See application file for complete search history.

(56) References Cited

U.S. PATENT DOCUMENTS

| | | | |
|---|---|---|---|
| 10,963,687 B1* | 3/2021 | Williams | G06V 30/414 |
| 11,574,305 B1* | 2/2023 | Griffin | H04L 9/3247 |
| 2002/0101614 A1* | 8/2002 | Imes | H04N 1/3872 |
| | | | 358/1.11 |
| 2010/0121775 A1* | 5/2010 | Keener, Jr | G06Q 30/02 |
| | | | 705/347 |
| 2017/0132626 A1* | 5/2017 | Kennedy | G06Q 20/065 |
| 2018/0181768 A1* | 6/2018 | Leporini | H04L 63/08 |
| 2018/0308090 A1* | 10/2018 | Leavitt | G06Q 20/40 |

* cited by examiner

*Primary Examiner* — Vance M Little
(74) *Attorney, Agent, or Firm* — CANTOR COLBURN LLP

(57) ABSTRACT

A first digital asset of a first entity is stored in a blockchain, in response to checking that an electronic option is selected for storing the first digital asset in the blockchain. A second digital asset of a second entity is received and is based at least in part on having satisfied the first digital asset. The first digital asset is validated for agreement with the second digital asset. The second digital asset is stored in the blockchain, in response to checking that an electronic option is selected for storing the second digital asset in the blockchain and in response to the being in agreement. A third digital asset is received on behalf of the first entity, in response to the first and second digital assets being available in the blockchain, the third digital asset being an indication that a requirement is satisfied for the second digital asset.

20 Claims, 9 Drawing Sheets

AUTOMATED VALIDATION AND SECURITY FOR DIGITAL ASSETS IN A COMPUTER ENVIRONMENT

BACKGROUND

The present invention generally relates to computer systems, and more specifically, to computer-implemented methods, computer systems, and computer program products configured and arranged to provide automated validation and security for digital assets in a computer environment.

In distributed computing environments, there can be numerous jobs or queries arriving as workloads to be processed using the computing resources of the computing environment. In computing environments, there is a growing security threat in transactions of digital assets. Computer security, cybersecurity, or information technology security (IT security) is the protection of computer systems and networks from information disclosure, theft of, or damage to their hardware, software, or electronic data, as well as from the disruption or misdirection of the services they provide. Computer security is becoming increasingly significant due to the continuously expanding reliance on computer systems, the Internet, wireless network standards, storage, and the transfer of electronic data. Cybersecurity is also one of the significant challenges in the contemporary world because of its complexity and interconnectivity.

SUMMARY

Embodiments of the present invention are directed to computer-implemented methods for provide automated validation and security for digital assets in a computer environment. A non-limiting computer-implemented method includes receiving, by a computer system, a first digital asset of a first entity, and storing, by the computer system, the first digital asset in a blockchain, in response to checking that a first electronic option is selected for storing the first digital asset in the blockchain. The method includes receiving, by the computer system, a second digital asset of a second entity, the second digital asset being based at least in part on having satisfied the first digital asset, and validating, by the computer system, that a first content of the first digital asset is in agreement with a second content of the second digital asset. Also, the method includes storing, by the computer system, the second digital asset in the blockchain, in response to checking that a second electronic option is selected for storing the second digital asset in the blockchain and in response to the first content being in agreement with the second content. The method includes receiving, by the computer system, a third digital asset on behalf of the first entity, in response to the first digital asset and the second digital asset being available in the blockchain, the third digital asset being an indication that a requirement is satisfied for the second digital asset on behalf of the first entity. Blockchain technology is used to enhance trust between multiple parties.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
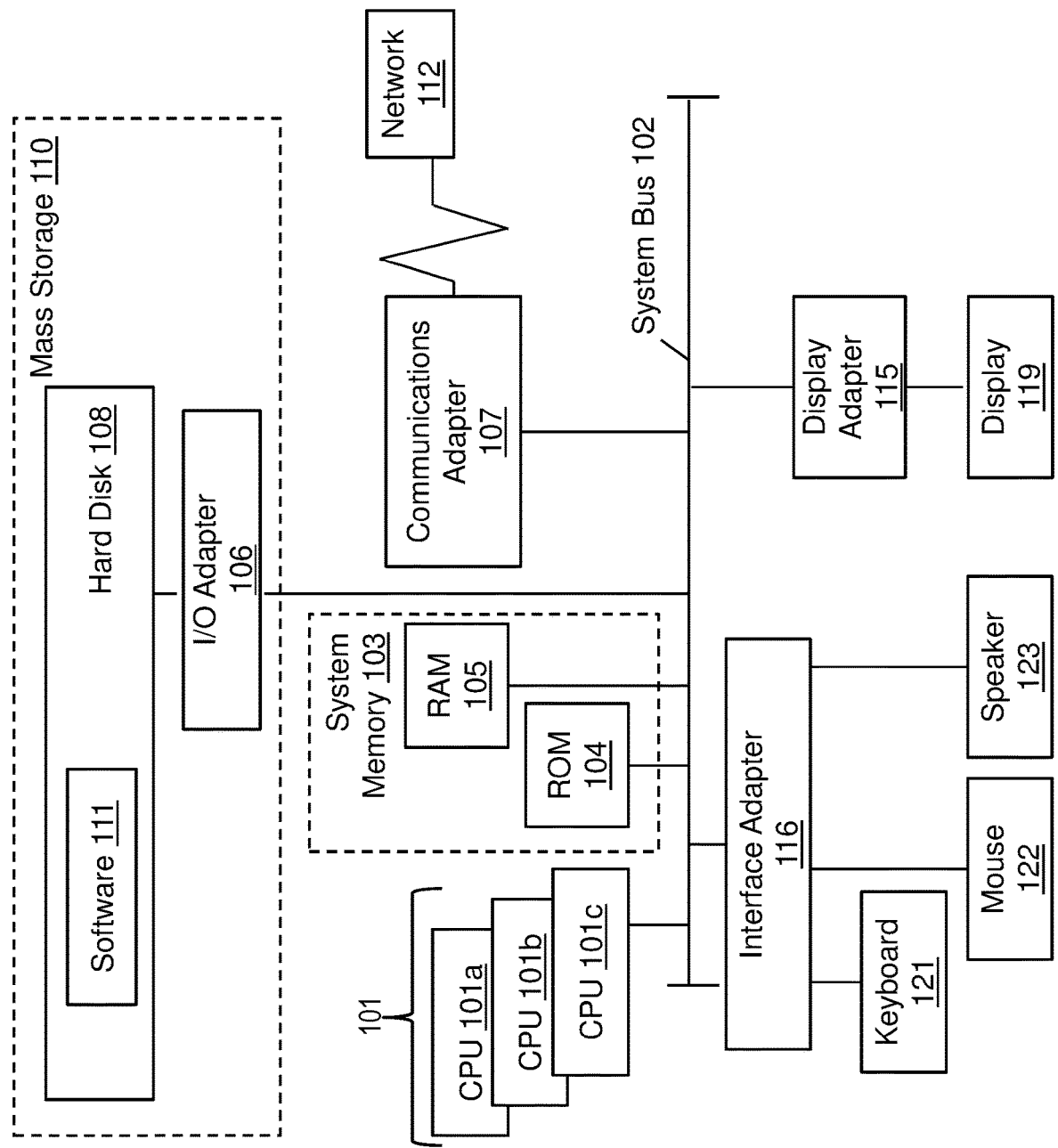
FIG. 1 depicts a block diagram of an example computer system for use in conjunction with one or more embodiments of the present invention.

One or more embodiments of the invention disclose an automated management system configured and arranged to provide automated validation and security for digital assets in a computer environment. In every business, discrepancies in financial settlements can occur at any given time. When there is a mismatch in the records between two parties, both parties have to spend time, effort, and working capital for error correction and reconciliation. One or more embodiments solve this complexity by harnessing the power of blockchain. Using blockchain, it is impossible to manipulate data after validation (i.e., immutability), it is transparent in a way that has not existed before (i.e., transparency), and a single source of truth is provided where every party has the exact same information (i.e., trust).

With the automated management system of one or more embodiments, digital assets like contracts, purchase orders, advance shipping notices, invoices, and payments are cross-validated and are stored in a secure private blockchain, such as the Hyperledger fabric blockchain by IBM®, which means that the network consists of only members involved and is not a public blockchain like that used in cryptocurrency trading. Thus, the automated management system provides services that are further secured by the use of a secure blockchain enabled private business-to-business (B2B) network.

In one or more embodiments, the automated management system can receive various forms of arbitrary formats as input. These formats of the input are first processed via an optical character recognition (OCR) system, so that plain text may be extracted from the input. This plain text data may be processed by an artificial intelligence system that parses the input into a consistent format that can be input into a standard database and/or generated into a digital asset. This data may be used internally for manual analysis and/or for the generation of reports, and it may be sent to third party services to complete transactions and synchronize data. In one example, the OCR system can be used jointly with the artificial intelligence system in order to process data from invoices in a nonstandard format (e.g., a digital image or portable document format (PDF)) into a consistent data format consumable by a standard database. The automated management system may be used by a buyer and supplier to input purchase orders and invoices into their respective enterprise resource planning (ERPs) and/or procurement networks, thereby providing seamless integration with existing ERPs and procurement networks. This is made possible by the database of standardized data, which allows simple serialization for data transport to various third-party application programming interface (API) endpoints, according to one or more embodiments. For example, the automated management system may interface with Open ICS in order to log invoice data into SAP Ariba. In one or more embodiments, the automated management system provides an integrated exception resolving system (e.g., as an alert module) on the supplier end, which alerts the supplier to purchase order mismatches, incorrect line items, purchase order value mismatches, etc. This prevents the need for lengthy discussions that may occur if an incorrect invoice is sent to a buyer. One or more embodiments allow suppliers to create multiple non-purchase order invoices to be processed in a similar fashion as a typical purchase order associated invoice, including all ERP integrations. In one or more embodiments, a user portal is available in various mediums such as on the web and/or through an application such that a vendor may track the status of their invoices, and any disputes can be resolved through a trackable ticket system rather than disorganized email threads and spreadsheets. One or more embodiments provide the ability to generate an analysis of data from processed invoices.

The following terms are described below.

Application programming interface (API) is a computing interface that defines interactions between multiple software intermediaries. An API can define the kinds of calls or requests that can be made by various computer-based entities, how to make the calls, the data formats that should be used for said calls, the conventions to follow for said calls, etc. An API can also provide extension mechanisms so that users can extend existing functionality in various ways and to varying degrees. An API can be entirely custom, specific to a component, and/or designed based on an industry-standard to ensure interoperability. An API can enable modular programming, allowing users to use the interface independently of the implementation.

Blockchain is a digital ledger where transactions are recorded chronologically and publicly. Each block typically contains a cryptographic hash of the previous block, a timestamp and transaction data.

Business-to-business (B2B) describes a situation where one business makes a commercial transaction with another.

Enterprise resource planning (ERP) is the integrated management of main business processes, often in real time and mediated by software and technology.

JSON (JavaScript Object Notation) is an open standard file format, and data interchange format, that uses human-readable text to store and transmit data objects consisting of attribute-value pairs and array data types (or any other serializable value). In other embodiments, other data formats such as XML can be utilized in lieu of JSON.

Optical character recognition or optical character reader (OCR) is the electronic conversion of images of typed, handwritten, or printed text into machine-encoded text, whether from a scanned document, a photo of a document, a scene-photo and/or from subtitle text superimposed on an image.

Purchase order (PO) is a commercial document and first official offer issued by a buyer to a seller indicating types, quantities, and agreed prices for products or services.

Representational state transfer (REST) is a software architectural style that uses a subset of HTTP. It is commonly used to create interactive applications that use Web services. A Web service that follows these guidelines is called RESTful. Such a Web service must provide its Web resources in a textual representation and allow them to be read and modified with a stateless protocol and a predefined set of operations. This approach allows interoperability between the computer systems on the Internet that provide these services. REST is an alternative to, for example, SOAP as a way to access a Web service.

REST API can be an application programming interface (API) that conforms to the constraints of REST architectural style and allows for interaction with various RESTful web services.

Software as a service (SaaS) can be a software licensing and delivery model in which software is licensed on a subscription basis and is centrally hosted.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc., (collectively or generically referred to as processor(s)

101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
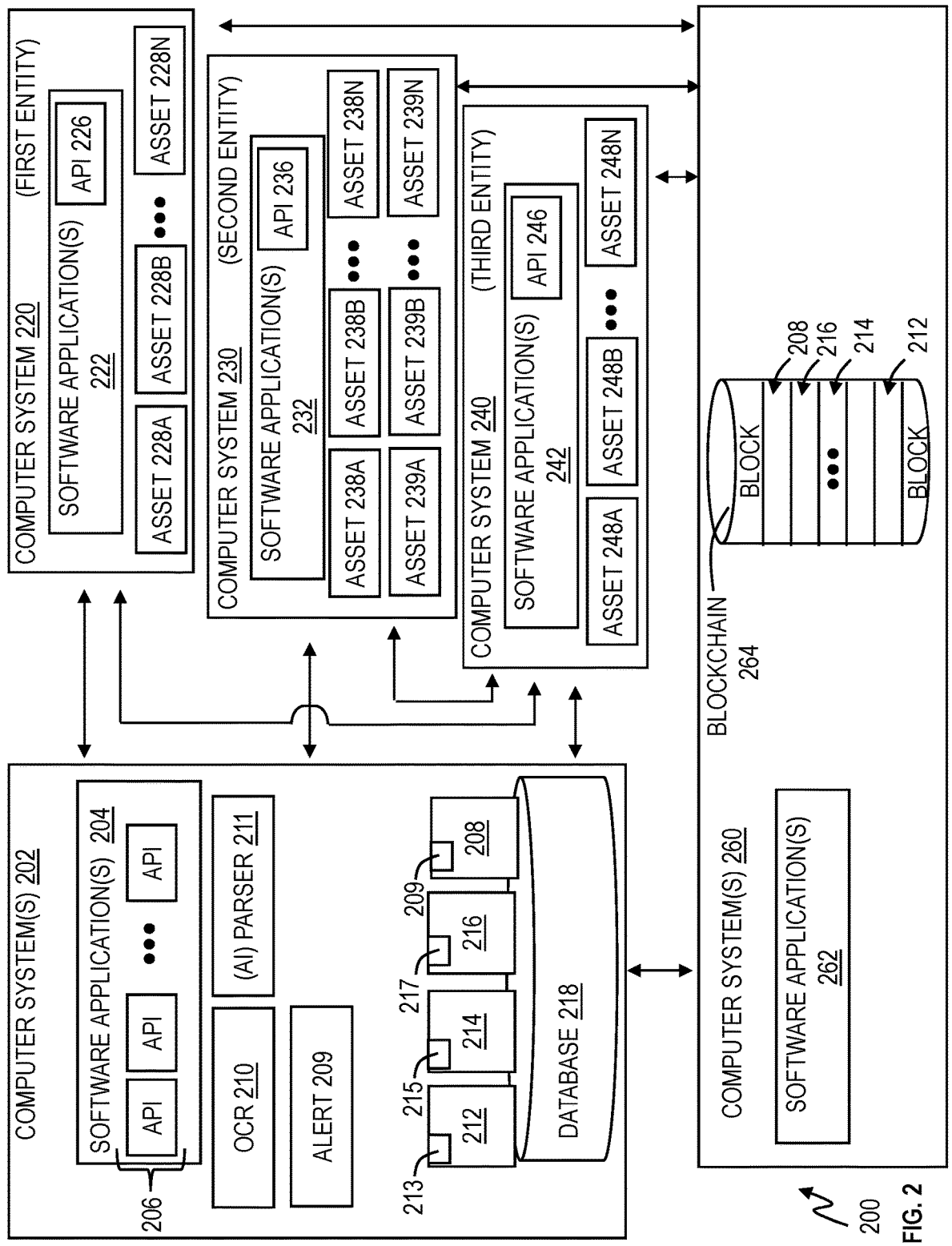
FIG. 2 depicts a block diagram of an example system configured to provide automated validation and security for digital assets in a computer environment according to one or more embodiments of the present invention.

FIG. 2 depicts a block diagram of an example system 200 configured to provide automated validation and security for digital assets in a computer environment according to one or more embodiments of the invention. The system 200 can be representative of a computer environment. In system 200, there can be many interconnected computer systems 202, 220, 230, 240, 260. Any functionality and/or features of computer systems 100 may be integrated in computer systems 202, 220, 230, 240, 260. Computer systems 202, 220, 230, 240, 260 may communicate over wired networks, wireless networks, and/or various combinations of wired and wireless networks. Computer systems 202, 220, 230, 240, 260 may include any of the software components and hardware components described for computer system 100. Software applications 204, 222, 232, 242, 262, parsing module 211, alert module 209 may include and/or be representative of various software applications such as software 111, which can be executed as computer-executable instructions on one or more processors 101 in order to perform operations according to one or more embodiments of the invention. The system 200 may be one or more portions of a cloud computing environment 50 depicted in FIG. 8. Features and functionality of computer system 202 may be implemented in any applicable portion of FIG. 8, including hardware and software 60, workloads layer 90, etc.

The data processed by computer system 202 as the automated management system include hundreds, thousands, and/or millions of digital assets, also referred to as "big data"; this data is sent and received among the various computer systems in system 200. In accordance with one or more embodiments, the enormous size of the processed data (i.e., incoming, generated, validated, stored, etc.) requires management, processing, and search by a machine (such as computer system 202), for example, using computer-executable instructions, which could not be practically managed, stored, analyzed, and/or processed as discussed herein within the human mind using the aid of pen and paper.

Computer system 202 is the automated management system configured to provide automated validation and security for digital assets in a computer environment. Computer system 220 may be representative of an entity and/or enterprise that is requesting one or more transactions with computer system 220. Computer system 220 may be representative of a buyer. Computer system 230 is representative of an entity and/or enterprise that may be a supplier or vendor. Software applications 222, 232 can include features and/or functionality of an enterprise resource planning system. Computer system 240 is representative of an entity and/or enterprise that can electronically provide financial resources to computer system 230 on behalf of computer system 220. Enterprise resource planning is the integrated management of main business processes, often in real time and mediated by software and technology. Enterprise resource planning is usually referred to as a category of management software, which typically includes a suite of integrated applications, that an organization can use to collect, store, manage, and interpret data from many business activities. Enterprise resource planning systems can be local based or cloud based.

Although one example buyer, supplier, and financial institution is shown for the sake of conciseness, there are numerous buyers, suppliers, and financial institutions in system 200, each having their own computer system 220, 230, 240 communicating with and using the services of computer system 202 according to one or more embodiments.

Software application 204 may create an interface and/or graphical user interface for receiving data from computer systems 220, 230, 240, respectively. The interface may be a user portal such as a web portal. The interface has a software architectural style, such as representational state transfer (REST), for interactions between software applications. The software applications may utilize REST APIs for communicating and interfaces, such as APIs 206, 226, 236, 246. Also, the APIs may utilize the software architectural style for Open ICS or any known standard understood by one of ordinary skill in the art. Software application 222 may have credentials provided in advance for logging into and interfacing with software application 204 of computer system 202. Similarly, software applications 232, 242 may respectively have credentials in advance for logging into and interfacing with software application 204 of computer system 202.

Figure 3:
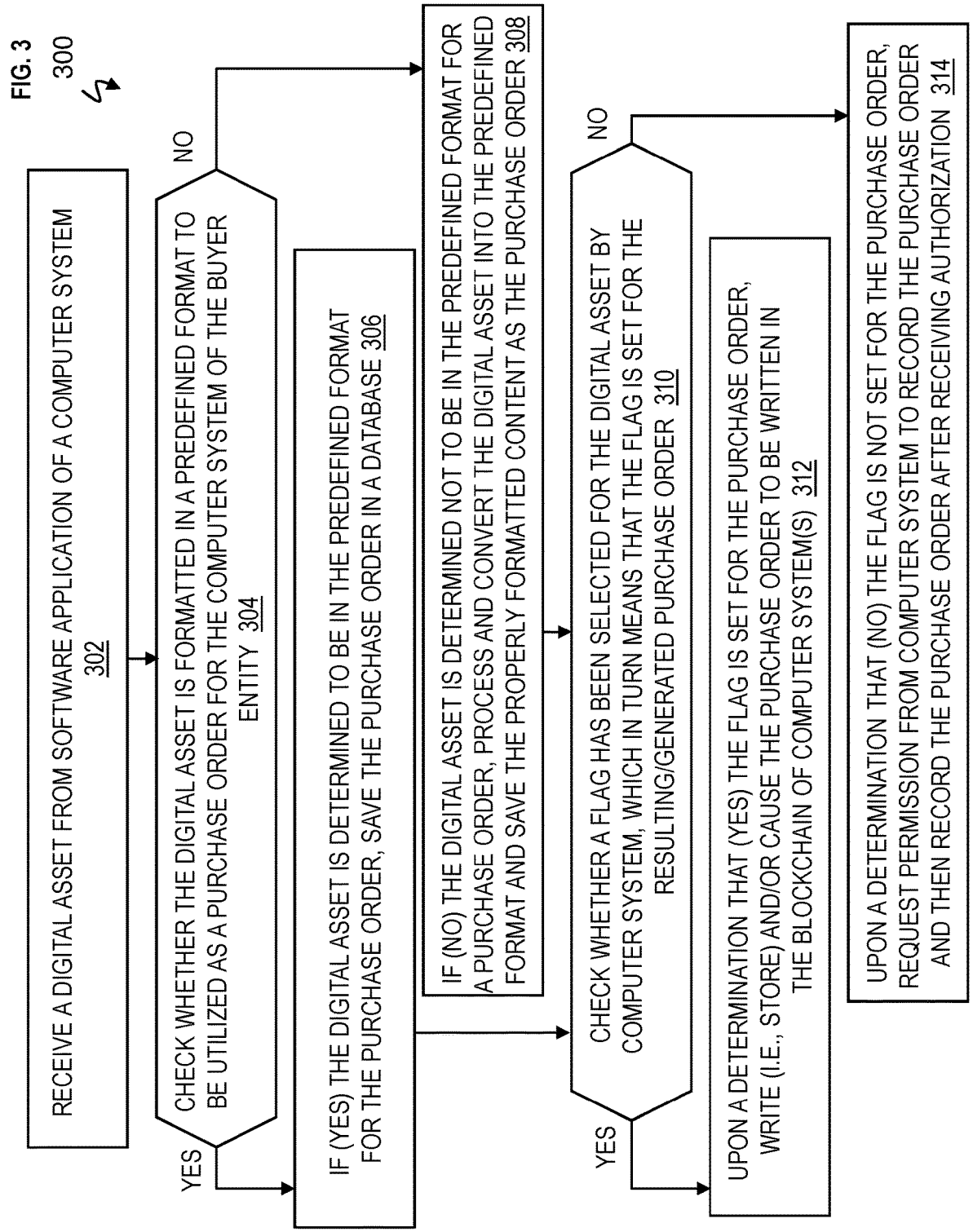
FIG. 3 is a flowchart of a process for providing automated validation and security for digital assets in a computer environment according to one or more embodiments of the present invention.

FIG. 3 is a flowchart of a process 300 for providing automated validation and security for digital assets in a computer environment according to one or more embodiments of the invention. The computer system 220 of a buyer may engage and/or may provide an electronic request to the computer system 202 for automated management services. As noted herein, a web portal, a mobile application, or other types of computer programs could be utilized for an electronic request be sent, etc., in order to utilize the automated services.

At block 302, software application 204 of computer system 202 is configured to receive a digital asset (e.g., digital asset 228A) from software application 222 of computer system 220. Computer system 220 can include example digital asset 228A, digital asset 228B, through digital asset 228N, generally referred to as digital assets 228, where 228N represents the last of the digital assets. Software application 204 is configured to receive various forms of arbitrary input as the digital asset from computer system 220. The digital asset may be a purchase order, and/or the digital asset may be documents such as photos, handwritten notes, PDF documents, images, forms, etc., utilized to generate the purchase order by computer system 202.

Software application 204 is configured to communicate with software application 222 of computer system 220, software application 232 of computer system 230, and software application 242 of computer system 240. Software application 204 can push and/or provide one or more APIs 226, APIs 232, APIs 242 to respective software applications 222, 232, 242 for installation and interfacing with software application 204. Also, software applications 222, 232, 242 can pull/request their respective APIs 226, APIs 232, APIs 242 for installation.

At block 304, software application 204 of computer system 202 is configured to check whether the digital asset 228A is formatted in a predefined format to be utilized as a purchase order 212 for computer system 220 of the buyer entity. An example of the predefined format may be JSON, Extensible Markup Language XML, etc.

At block 306, if (Yes) the digital asset 228A is determined to be in the predefined format for the purchase order 212, software application 204 is configured to save the purchase order 212 in a database 218.

At block 308, if (No) the digital asset 228A is determined not to be in the predefined format for a purchase order, software application 204 is configured to process and convert the digital asset 228A into the predefined format and save the properly formatted content as the purchase order 212. In one or more embodiments, software application 204 may include, be integrated with, and/or call an optical character recognition (OCR) module 210 and a parsing module 211. OCR module 210 can be used to implement optical character recognition on the input text of digital asset 228A. More specifically, OCR module 210 can extract any plain text from the digital asset 228A. The parsing module 211 may be and/or include an artificial intelligence (AI)/machine learning (ML) parsing module, which can process the plain text data by parsing the input into a predefined format resulting in the purchase order 212. In one or more embodiments, parsing module 211 may include computer executable instructions and rules for parsing data assets, such as data asset 228A, to generate purchase order 212 as discussed herein and not require AI/ML.

The parsing module 211 can implement the various AI and/or ML functionalities discussed herein. Parsing module 211 can use machine learning as a type of artificial intelligence that provides computer system 202 with the ability to learn without being explicitly programmed. Machine learning focuses on the development of computer programs that can teach themselves to grow and change when exposed to new data. Example machine learning techniques that can be used herein may include, but are not limited to, the following: decision tree learning, association rule learning, artificial neural networks, inductive logic programming, support vector machines, clustering, Bayesian networks, reinforcement learning, representation learning, similarity, and metric learning, and/or sparse dictionary learning. Random forests (e.g., random decision forests) are an ensemble learning method for classification, regression, and other tasks that operate by constructing a multitude of decision trees at training time and outputting the class that is the mode of the classes (e.g., classification) or mean prediction (e.g., regression) of the individual trees. Random forests can correct for the tendency of decision trees to overfit to their training set. Deep learning is a family of machine learning methods based on learning data representations. Learning can be supervised, semi-supervised, or unsupervised. During training on datasets, parsing module 211 can study and construct algorithms that can then learn from and make predictions on data. These algorithms can work by making data driven predictions or decisions, through building a mathematical model from input data during training. The data used to build the final model usually comes from multiple datasets. In particular, three datasets are commonly used in different stages of the creation of the model for parsing module 211. The model is initially fit on a training dataset, which is a set of examples used to fit the parameters (e.g., weights of connections between neurons in artificial neural networks) of the model. The model (e.g., a neural network or a naive Bayes classifier) is trained on the training dataset using a supervised learning method (e.g., gradient descent or stochastic gradient descent). In practice, the training dataset often consists of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g., the number of hidden units in a neural network). Validation datasets can be used for regularization by early stopping, for example, stop training when the error on the validation dataset increases, as this is a sign of overfitting to the training dataset. This procedure is complicated in practice by the fact that the error of the validation dataset may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (e.g., in cross-validation), the test dataset is also called a holdout dataset.

Software application 204 inserts the extracted/parsed text into the purchase order 212, which is then stored in the database 218. Software application 204 can add the extracted/parsed data into the predefined format for the purchase order 212. Software application 204 can also interact/communicate with software application 222 of computer system 220 to obtain additional information and/or instructions. Analogously, software application 204 can also interact/communicate with software applications 232 of computer system 230 and software application 242 of computer system 240 to obtain additional information and instructions, respectively.

Referring to FIG. 3, at block 310, software application 204 is configured to check whether a flag 213 has been selected for the digital asset 228A by computer system 220, which in turn means that the flag 213 is set for the resulting/generated purchase order 212. Software application 222 of computer system 220 transmits the flag 213 along with the digital asset 228A, and software application 204 attaches and/or associates the selection for the flag 213 with the purchase order 212 requested by computer system 220 (e.g., the buyer entity). Having the flag 213 set (e.g., a bit set to "1") is an indication that the computer system 220 has authorized and/or is requesting that the purchase order 212 be transferred to and written in a blockchain 264 (e.g., blockchain storage system or ledger). It is noted that software application 205 provides a selectable option for any computer system, such as computer systems 220, 230, 240 using the automated management service to choose to select their respective flag (e.g., flags 209, 213, 215, 217) for a batch of digital assets, to have a default setting of on or off, and/or to choose a selection each time.

At block 312, upon a determination that (Yes) the flag 213 is set for the purchase order 212, software application 204 is configured to write (i.e., store) and/or cause the purchase order 212 to be written in the blockchain 264 of computer system(s) 260. The purchase order 212 is recorded/stored as a block of data in the blockchain 264. For example, software application 204 can communicate with one or more software applications 262 of computer system 260 and submit the purchase order 212 for recordation in the blockchain 264, thus causing software application 262 to process and store the purchase order 212.

Blockchain is a shared, immutable ledger that facilitates the process of recording transactions and tracking assets in a business network. The blockchain network can track orders, payments, accounts, production, and much more. Because members share a single view of the truth, you can see all details of a transaction end to end, giving you greater confidence, as well as new efficiencies and opportunities. Using distributed ledger technology, all network participants have access to the distributed ledger and its immutable record of transactions. With this shared ledger, transactions are recorded only once, eliminating the duplication of effort that's typical of traditional business networks. With immutable records, no participant can change or tamper with a transaction after it's been recorded to the shared ledger. If a transaction record includes an error, a new transaction must be added to reverse the error, and both transactions are then visible.

As each transaction occurs, it is recorded as a "block" of data. Those transactions show the movement of an asset that can be tangible or intangible. The data block can record the information of one's choice: who, what, when, where, and how much and even the condition. Each block is connected to the ones before and after it. These blocks form a chain of data as an asset moves from place to place or ownership changes hands. The blocks confirm the exact time and sequence of transactions, and the blocks link securely together to prevent any block from being altered or a block from being inserted between two existing blocks. Moreover, transactions are blocked together in an irreversible chain: a blockchain. Each additional block strengthens the verification of the previous block and hence the entire blockchain. This renders the blockchain tamper-evident, delivering the key strength of immutability. This removes the possibility of tampering by a malicious actor and builds a ledger of transactions network members can trust.

Referring to FIG. 3, at block 314, upon a determination that (No) the flag 213 is not set for the purchase order 212, software application 204 is configured to request permission from computer system 220 to record the purchase order 212 and then record the purchase order 212 after receiving authorization. Software application 204 can send an alert and/or engage alert module 209 to send an alert to software application 222 that a selection is required to permit the purchase order 212 to be stored on blockchain 264. As such, software application 204 receives authorization from software application 222.

In one or more embodiments, software application 204 can ask software application 222 if one or more fields (e.g., the buyer's identity, social security number, personal address, etc.) should be anonymized in the purchase order 212 (and/or digital asset 228A) before storing the purchase order (or any other digital asset) on the blockchain 264. If anonymization is required, software application 204 modifies the fields in the purchase order 212 (and/or digital asset 228A) using a method known by one of ordinary skill in the art.

The purchase order 212, now stored in the blockchain 264, is visible to various suppliers, including computer system 230 of a supplier entity, as well as computer system 220 and computer system 240. In one or more embodiments, software application 204 may send an alert (e.g., via alert module 209) to software applications 222, 232, 242 of computer systems 220, 230, 240, respectively, in which the alert indicates that the purchase order 212 is available to be filled. In one or more embodiments, the purchase order 212 may contain anonymized data such that the even after decryption of the block in the blockchain 264 for the purchase order 212, the identity of the buyer may not be identified; in addition to informing the supplier of the available purchase order 212 in blockchain 264, the alert may be utilized to identify the identity (e.g., using a buyer identifier) of the buyer making the request. Also, a code, method, and/or key may be provided in the alert to restore the anonymized data. In one or more embodiments, the purchase order 212 stored in the blockchain 264 may contain the identity of the buyer making the request.

Figure 4:
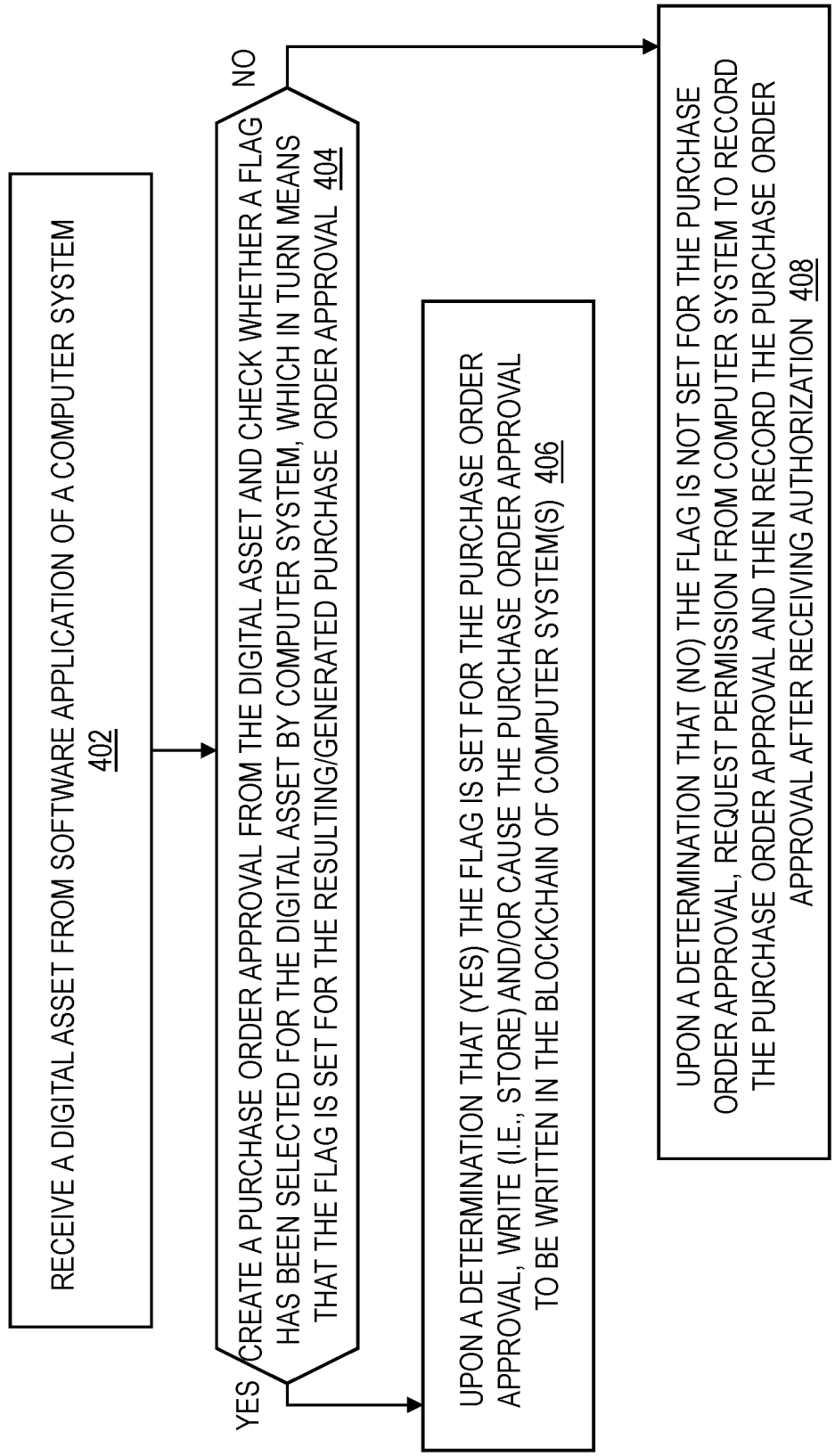
FIG. 4 is a flowchart of a process for providing automated validation and security for digital assets in a computer environment according to one or more embodiments of the present invention.

FIG. 4 is a flowchart of a process 400 for providing automated validation and security for digital assets in a computer environment according to one or more embodiments of the invention. Although an example scenario illustrates operations of computer system 230 for a single supplier, it should be appreciated that the description applies by analogy to numerous suppliers. For example, multiple suppliers can simultaneously parse and view the purchase order 212 in blockchain 264. Software application 204 can send the alert that the purchase order 212 is available for view in blockchain 264 to numerous suppliers, based on a table stored in database 218. For illustration purposes and ease of understanding, a single supplier is depicted interfacing with the automated management system provided by computer system 202.

At block 402 of process 400, software application 204 is configured to receive a digital asset (e.g., digital asset 238A) from software application 232 of computer system 230. Computer system 230 can include example digital asset 238A, digital asset 238B, through digital asset 238N, generally referred to as digital assets 238, where 238N represents the last of the digital assets. Software application 232 has viewed and parsed the purchase order 212 for computer system 220 stored in blockchain 264. Software application 232 may be configured to interrogate or index one or more databases (not shown) to determine that the supplier entity has inventory for the requested items in the purchase order 212. As such, software application 232 sends the digital asset 238A as acceptance of the purchase order 212 in blockchain 264. The digital asset 238A can be an electronic data structure that identifies the purchase order 212 and acceptance of the purchase order 212. The digital asset 238A may include a buyer identification, supplier identification, items (e.g., goods and services) to be supplied, etc., along with all or some of the information in purchase order 212.

At block 404, software application 204 is configured to generate/create a purchase order approval 214 from the digital asset 238 and check whether a flag 215 has been selected for the digital asset 238A by computer system 230, which in turn means that the flag 215 is set for the resulting/generated purchase order approval 214. The purchase order approval 214, and likewise the digital asset 238A, indicates that the supplier entity of computer system 230 has approved the purchase order 212. In one or more embodiments, the purchase order approval 214 is a digital asset that can be captured in a user portal by software application 204. Software application 222 of computer system 220 transmits the flag 215 as an electronic option along with the digital asset 228A, and software application 204 attaches and/or associates the selection for the flag 213 with the purchase order 212 requested by computer system 220 (e.g., the buyer entity). Having the flag 215 set (e.g., a bit set to "1") is an indication that the computer system 230 has authorized and/or is requesting that the purchase order approval 214 be transferred to and written in the blockchain 264 (e.g., blockchain storage system or ledger).

At block 406, upon a determination that (Yes) the flag 215 is set for the purchase order approval 214, software application 204 is configured to write (i.e., store) and/or cause the purchase order approval 214 to be written in the blockchain 264 of computer system(s) 260. The purchase order approval 212 is recorded/stored as a block of data in the blockchain 264. For example, software application 204 can communicate with one or more software applications 262 of computer system 260 and submit the purchase order approval 214 for recordation in the blockchain 264, thus causing software application 262 to process and store the purchase order approval 214.

At block 408, upon a determination that (No) the flag 215 is not set for the purchase order approval 214, software application 204 is configured to request permission from computer system 230 to record the purchase order approval 214 and then record the purchase order approval 214 after receiving authorization.

The purchase order approval 214, now stored in the blockchain 264, is visible to the buyer for computer system 220 who requested purchase order 212, as well as to computer system 230 and computer system 240. In one or more embodiments, software application 204 may send an alert, for example, via alert module 209, to software applications 222, 232, 242 of computer systems 220, 230, 240, respectively, in which the alert indicates that the purchase order approval 214 is viewable to fill the corresponding purchase order 212. In one or more embodiments, the purchase order approval 214 may contain anonymized data such that the even after decryption of the block in the blockchain 264 for the purchase order approval 214, the identity of the buyer and/or seller may not be identified; in addition to informing the buyer of the purchase order approval 214 in blockchain 264, the alert may be utilized to identify the identity of the supplier approving the purchase order. In one or more embodiments, the purchase order approval 214 stored in the blockchain 264 may contain the identity of the supplier approving the request.

In one or more embodiments, the software application 232 can send a digital asset to software application 204, and software application 204 is configured to generate an advance shipment notification (not shown) that is stored in the blockchain 264 as discussed herein. Accordingly, the advance shipment notification of goods is visible to the computer systems 220, 230, 240 in accordance with any of the techniques discussed herein. Software application 204 may send an alert regarding the advance shipment notification to the computer systems 220, 230, 240 as discussed herein.

In one or more embodiments, the software application 222 of computer system 220 can send a digital asset to software application 204, and software application 204 is configured to generate a good receipt status (not shown) that is stored in the blockchain 264 as discussed herein. Accordingly, the good receipt status of the goods/services is visible to the computer systems 220, 230, 240 in accordance with any of the techniques discussed herein. Software application 204 may send an alert regarding the good receipt status to the computer systems 220, 230, 240 as discussed herein. The good receipt status indicates that the computer system 220 is in receipt of the goods and/or services.

Figure 5:
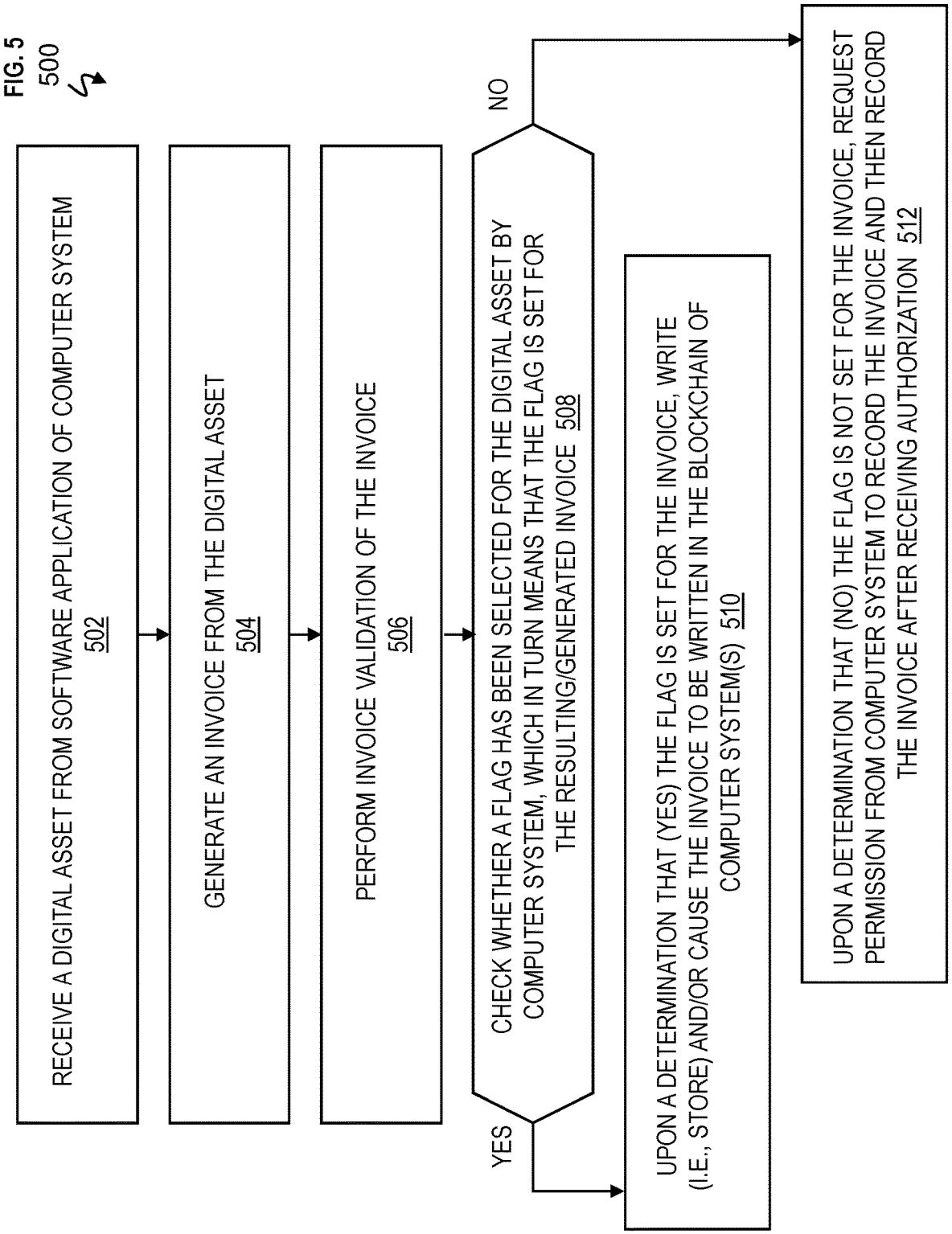
FIG. 5 is a flowchart of a process for providing automated validation and security for digital assets in a computer environment according to one or more embodiments of the present invention.

FIG. 5 is a flowchart of a process 500 for providing automated validation and security for digital assets in a computer environment according to one or more embodiments of the invention. The goods and/or services have been supplied by computer system 230 of the supplier entity to the computer system 220 of the buyer entity, in response to any of the processes discussed herein including storage of the purchase order 212 in the blockchain 264, the alert that the purchase order 212 is stored in the blockchain 264, storage of the purchase order approval 214 in the blockchain 264, storage of a good receipt status in the blockchain 264, etc. The goods and/or services can be and/or relate to electronic products, technological products, physical goods, physical services, computer resources in a cloud environment, etc. Computer resources may include an amount of CPU usage, CPU time, memory utilization, I/O requirements, RAM usage, etc.

At block 502 of process 500, software application 204 is configured to receive a digital asset (e.g., digital asset 239A) from software application 232 of computer system 230. Computer system 230 can include example digital asset 239A, digital asset 239B, through digital asset 239N, generally referred to as digital assets 239, where 239N represents the last of the digital assets. The digital asset 239 is an invoice for goods provided and/or services rendered by the supplier entity. For example, digital asset 239A corresponds to the invoice for supplying goods and/or services to fulfill the purchase order 212.

At block 504, software application 204 is configured to generate an invoice 216 from the digital asset 239A. For example, software application 204 may parse (the fields of) the digital asset 239A to extract information needed to generate the invoice 216. Also, in some cases, the digital asset 239A may already be in a format in compliance with a predefined format for the invoice 216. In one or more embodiments, the digital asset 239A can be uploaded via a user portal provided by software application 204. The invoice 216 is a digital asset.

At block 506, software application 204 is configured to perform invoice validation of the invoice 216. Software application 204 is configured to check and confirm that fields in the purchase order 212 agree with corresponding fields in the invoice 216. Also, software application 204 is configured to check and confirm that the calculation of the total value for items (e.g., goods/services) is accurate in the invoice 216. If the software application 204 determines that any fields in the invoice 216 are inaccurate or incorrect, software application 204 is configured to correct the fields and send to computer system 230 for confirmation; in response to receiving confirmation of values in the corrected fields from computer system 230, software application 204 is configured to verify that the invoice 216 is valid. Also, software application 204 is configured to identify the incorrect fields and send a request to computer system 230 for a correct value; in response to receiving new (correct) values for the incorrect fields from computer system 230, software application 204 is configured to verify that the invoice 216 is valid.

At block 508, software application 204 is configured to check whether a flag 217 has been selected for the digital asset 239A by computer system 220, which in turn means that the flag 217 is set for the resulting/generated invoice 216. Software application 232 of computer system 230 transmits the flag 217 along with the digital asset 239A, and software application 204 attaches and/or associates the selection for the flag 217 with the invoice 216 provided by computer system 230 (e.g., the supplier entity). Having the flag 217 set (e.g., a bit set to "1") is an indication that the computer system 230 has authorized and/or is requesting that the invoice 216 be transferred to and written in the blockchain 264 (e.g., blockchain storage system or ledger).

At block 510, upon a determination that (Yes) the flag 217 is set for the invoice 216, software application 204 is configured to write (i.e., store) and/or cause the invoice 216 to be written in the blockchain 264 of computer system(s) 260. The invoice 216 is recorded/stored as a block of data in the blockchain 264. As noted herein, software application 204 can communicate with one or more software applications 262 of computer system 260 and submit the invoice 216 for recordation in the blockchain 264, thus causing software application 262 to process and store the invoice 216.

At block 512, upon a determination that (No) the flag 217 is not set for the invoice 216, software application 204 is configured to request permission from computer system 230 to record the invoice 216 and then record the invoice 216 after receiving authorization.

The invoice 216, now stored in the blockchain 264, is visible to computer system 220 of the buyer entity, as well as computer system 220 and computer system 240. In one or more embodiments, software application 204 may send an alert, for example, via alert module 209, to software applications 222, 232, 242 of computer systems 220, 230, 240, respectively, in which the alert indicates that the invoice 216 is available for payment. In one or more embodiments, the purchase order 212 may contain anonymized data such that the even after decryption of the block in the blockchain 264 for the purchase order 212, the identity of the buyer may not be identified; in addition to informing the supplier of the available purchase order 212 in blockchain 264, the alert may be utilized to identify the identity (e.g., using a buyer identifier) of the buyer making the request. The alert may contain the method for restoring the anonymized data. In one or more embodiments, the purchase order 212 stored in the blockchain 264 may contain the identity of the buyer making the request.

Figure 6:
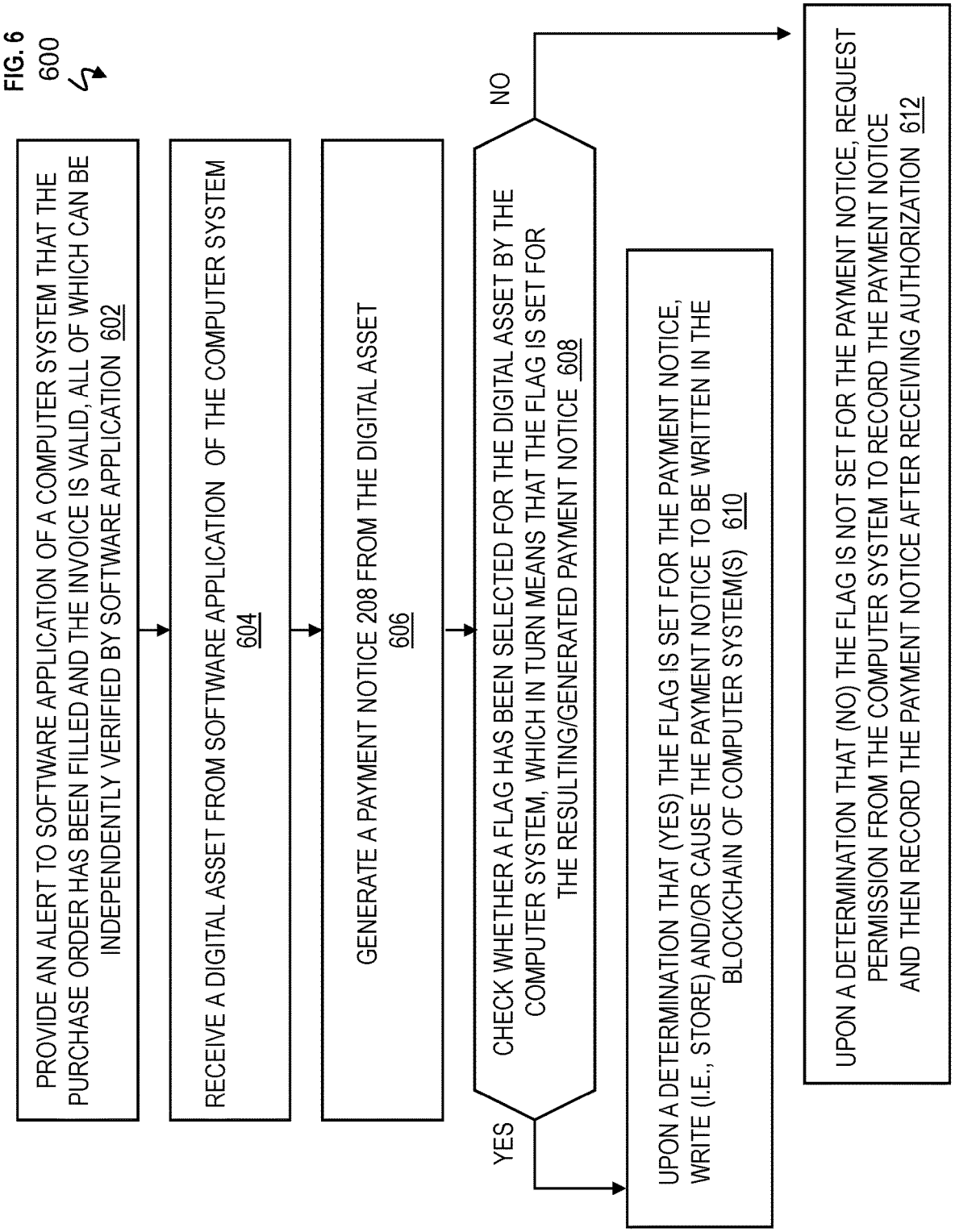
FIG. 6 is a flowchart of a process for providing automated validation and security for digital assets in a computer environment according to one or more embodiments of the present invention.

FIG. 6 is a flowchart of a process 600 for providing automated validation and security for digital assets in a computer environment according to one or more embodiments of the invention. The goods and/or services have been supplied by computer system 230 of the supplier entity to the computer system 220 of the buyer entity, in response to any of the processes discussed herein including storage of the purchase order 212 in the blockchain 264, the alert that the purchase order 212 is stored in the blockchain 264, storage of a good receipt status in the blockchain 264, storage of the invoice 216, etc.

At block 602, software application 204 of computer system 202 is configured to provide an alert to software application 242 of computer system 240 that the purchase order 212 has been filled, and the invoice 216 is valid, all of which can be independently verified by software application 242. Computer system 240 may be for a financial institution (such as a bank) that has the financial resources to make payment for invoices 216. In one or more embodiments, after receiving an initial alert from software application 204, software application 242 may have been scanning and viewing all of the processes beginning with the storage of the purchase order 212 on blockchain 264.

In one or more embodiments, computer system 220 may request that payment be made by computer system 240 to satisfy (the outstanding balance of) the invoice 216, and payment may be deducted from an account that belongs to the buyer and provided to an account of computer system 230 for the supplier. In one or more embodiments, the buyer and financial institution may have an arrangement that the financial institution will automatically pay for invoices 216 validated by computer system 202. Whether the payment is made from an account of the buyer at the financial institution and/or the financial institution made payment (e.g., a loan) on behalf of the buyer, the invoice 216 has now been paid.

Referring to FIG. 6, at block 604, software application 204 is configured to receive a digital asset (e.g., digital asset 248A) from software application 242 of computer system 240. Computer system 240 can include example digital asset 248A, digital asset 248B, through digital asset 248N, generally referred to as digital assets 248, where 248N represents the last of the digital assets. The digital asset 249 is an indication that payment has been made for goods provided and/or services, thereby performed an electronic transfer of funds. For example, digital asset 248A corresponds to and is electronic evidence of payment of the invoice 216 for supplying goods and/or services to fulfill the purchase order 212.

At block 606, software application 204 is configured to generate a payment notice 208 from the digital asset 248A. For example, software application 204 may parse (the fields of) the digital asset 248A to extract information needed to generate the payment notice 208. Also, in some cases, the digital asset 248A may already be in a format in compliance with a predefined format for the payment notice 208. The payment notice 208 is a digital asset and may be uploaded to software application 204 through a user portal.

At block 608, software application 204 is configured to check whether a flag 209 has been selected for the digital asset 248A by computer system 240, which in turn means that the flag 209 is set for the resulting/generated payment notice 208. Software application 242 of computer system 240 transmits the flag 209 along with the digital asset 248A, and software application 204 attaches and/or associates the selection for the flag 209 with the payment notice 208 provided by computer system 240 (e.g., the financial institution). Having the flag 209 set (e.g., a bit set to "1") is an indication that the computer system 240 has authorized and/or is requesting that the payment notice 208 be transferred to and written in the blockchain 264 (e.g., blockchain storage system or ledger).

At block 610, upon a determination that (Yes) the flag 209 is set for the payment notice 208, software application 204 is configured to write (i.e., store) and/or cause the payment notice 208 to be written in the blockchain 264 of computer system(s) 260. The payment notice 208 is recorded/stored as a block of data in the blockchain 264. As noted herein, software application 204 can communicate with one or more software applications 262 of computer system 260 and submit the payment notice 208 for recordation in the blockchain 264, thus causing software application 262 to process and store the payment notice 208.

At block 612, upon a determination that (No) the flag 209 is not set for the payment notice 208, software application 204 is configured to request permission from computer system 240 to record the payment notice 208 and then record the payment notice 208 after receiving authorization.

The payment notice 208, now stored in the blockchain 264, is visible to computer systems 220, 230, 240. In one or more embodiments, software application 204 may send an alert to software applications 222, 232, 242 of computer systems 220, 230, 240, respectively, in which the alert indicates that the payment notice 208 is available for payment. In one or more embodiments, the payment notice 208 may contain anonymized data such that the even after decryption of the block in the blockchain 264 for the payment notice 208, the identity of the buyer, supplier, and/or financial institution may not be identified. To preserve the identity of the entities involved and/or personal information, the software application 204 may anonymize selected data in any of the digital assets stored in the blockchain 264 by using a particular replacement method, cryptographic method, etc. In one or more embodiments, the payment notice 208 stored in the blockchain 264 may contain the identity of the buyer, supplier, and/or financial institution providing the payment.

Although a single purchase order 212, purchase order approval 214, invoice 216, and payment notice 208 are illustrated for the sake of conciseness, computer system 202 can have and process numerous purchase orders 212, purchase order approvals 214, invoices 216, and payment notices 208 according to one or more embodiments.

Figure 7:
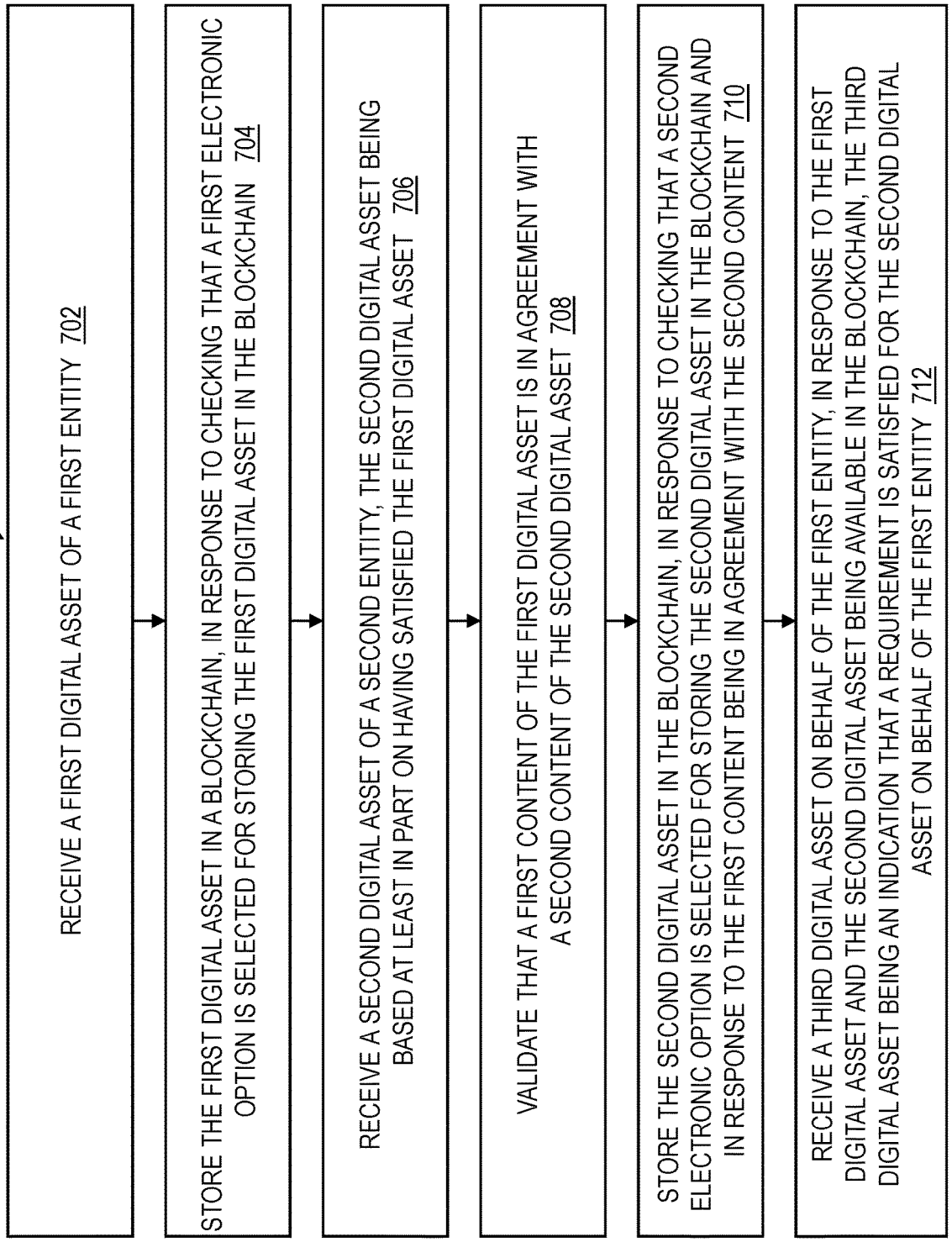
FIG. 7 is a flowchart of a computer-implemented method for providing automated validation and security for digital assets in a computer environment according to one or more embodiments.

FIG. 7 is a flowchart of a computer-implemented method 700 for providing automated validation and security for digital assets in a computer environment according to one or more embodiments of the invention. It is noted that the purchase orders 212, purchase order approvals 214, invoices 216, and payment notices 208 are digital assets that may be the same as, part of, and/or generated from other digital assets. The computer-implemented method 700 may be implemented in system 200 using computer system 202, which interfaces with other computer systems as discussed herein.

At block 702 of computer-implemented method 700, software application 204 of computer system 202 is configured to receive a first digital asset (e.g., one or more purchase orders 212 generated from and/or as one or more digital assets 228) of a first entity (e.g., computer system 220).

At block 704, software application 204 of computer system 202 is configured to store the first digital asset (e.g., one or more purchase orders 212 generated from and/or as one or more digital assets 228) in a blockchain 264, in response to checking that a first electronic option (e.g., flag 213) is selected for storing the first digital asset (e.g., one or more purchase orders 212 generated from and/or as one or more digital assets 228) in the blockchain 264.

At block 706, software application 204 of computer system 202 is configured to receive a second digital asset (e.g., one or more invoices 216 generated from and/or as one or more digital assets 239) of a second entity (e.g., computer system 230), the second digital asset being based at least in part on having satisfied the first digital asset.

At block 708, software application 204 of computer system 202 is configured to validate that a first content of the first digital asset is in agreement with a second content of the second digital asset.

At block 710, software application 204 of computer system 202 is configured to store the second digital asset (e.g., one or more invoices 216 generated from and/or as one or more digital assets 239) in the blockchain 264, in response to checking that a second electronic option (e.g., flag 217) is selected for storing the second digital asset (e.g., one or more invoices 216 generated from and/or as one or more digital assets 239) in the blockchain 264 and in response to the first content being in agreement with the second content.

At block 712, software application 204 of computer system 202 is configured to receive a third digital asset (e.g., one or more payment notices 208 generated from and/or as one or more digital assets 248) on behalf of the first entity (e.g., computer system 220), in response to the first digital asset and the second digital asset being available in the blockchain 264, the third digital asset (e.g., one or more payment notices 208 generated from and/or as one or more digital assets 248) being an indication (to all computer systems) that a requirement is satisfied (e.g., an electronic transaction such as a payment, transfer of funds, settlement of an obligation, etc.) for the second digital asset on behalf of the first entity.

The first digital asset (e.g., one or more purchase orders 212 generated from and/or as one or more digital assets 228) is an electronic request. The electronic request, by sending/inputting the first digital asset, can start the process of acquiring goods and/or services for the first entity. The electronic request can be input through a web portal by logging into software application 204. In one or more embodiments, the API 226 of software application 222, the API 236 of software application 232, and the API 246 of software application 242 may be utilized to interface with software application 204.

The second digital asset (e.g., one or more invoices 216 generated from and/or as one or more digital assets 239) is an indication of fulfillment of an electronic request of the first digital asset.

Validating that the first content of the first digital asset is in agreement with the second content of the second digital asset comprises: parsing first fields in the first content to identify a same description of items (e.g., goods and/or services) second fields in the second content; and determining that a value is accurate in the second fields in the second content, the value having been calculated based at least in part on a total of the items in the first content.

The computer system 202 is configured to cause an alert to be sent upon the first digital asset being stored in the blockchain 264, the alert being a notification to the first entity and the second entity that the first digital asset is viewable in the blockchain 264.

The alert further comprises an identity of the first entity, in response to the identity of the first entity being anonymized in the first digital asset stored in the blockchain; and the alert is sent to a plurality of entities for a reply, the second entity being a first to reply (e.g., computer system 230 may be the first supplier to reply back out of a plurality of other computer systems for suppliers (not shown)) with an approval of the first digital asset, the approval of the first digital asset being stored in the blockchain.

The computer system 202 is configured to cause an alert to be sent upon the second digital asset being stored in the blockchain, the alert being a notification to the first entity, the second entity, and a third entity (e.g., computer system 240) that the second digital asset is viewable in the blockchain 264; wherein the computer system 202 receives the third digital asset of the third entity, in response to the third entity satisfying the requirement (e.g., an electronic transaction such as a payment, transfer of funds, settlement of an obligation, etc.) for the second digital asset on behalf of the first entity.

It is to be understood that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
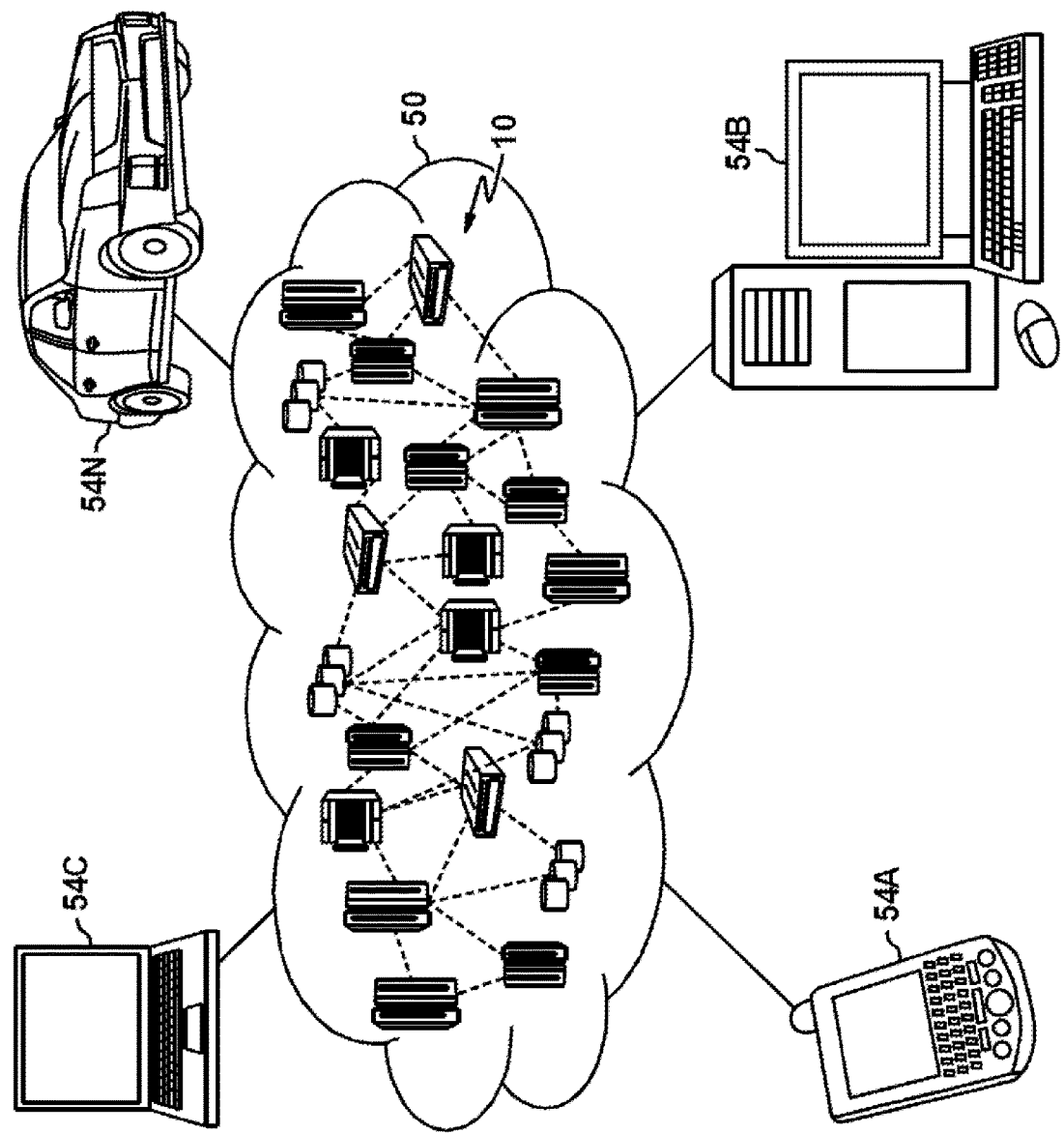
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
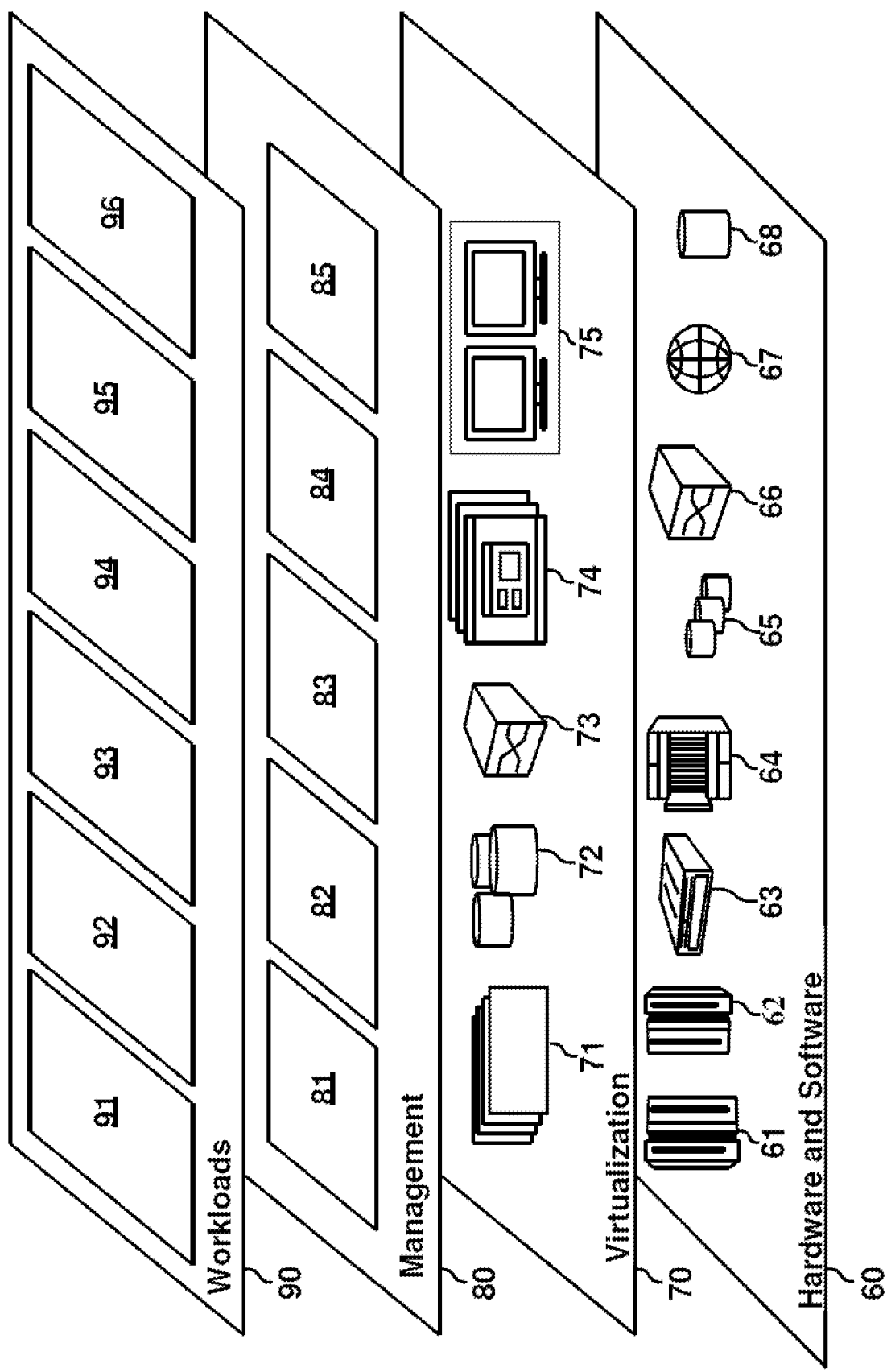
FIG. 9 depicts abstraction model layers according to one or more embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a computer system, a first digital asset of a first entity;
   storing, by the computer system, the first digital asset in a blockchain, in response to checking that a first electronic option is selected for storing the first digital asset in the blockchain;
   receiving, by the computer system, a second digital asset of a second entity, the second digital asset being based at least in part on having satisfied the first digital asset;
   validating, by the computer system, that a first content of the first digital asset is in agreement with a second content of the second digital asset;
   storing, by the computer system, the second digital asset in the blockchain, in response to checking that a second electronic option is selected for storing the second digital asset in the blockchain and in response to the first content being in agreement with the second content; and
   receiving, by the computer system, a third digital asset on behalf of the first entity, in response to the first digital asset and the second digital asset being available in the blockchain, the third digital asset being an indication that a requirement is satisfied for the second digital asset on behalf of the first entity.

2. The computer-implemented method of claim 1, wherein the first digital asset is an electronic request.

3. The computer-implemented method of claim 1, wherein the second digital asset is an indication of fulfillment of an electronic request of the first digital asset.

4. The computer-implemented method of claim 1, wherein validating that the first content of the first digital asset is in agreement with the second content of the second digital asset comprises:
   parsing first fields in the first content identify a same description of items second fields in the second content; and
   determining that a value is accurate in the second fields in the second content, the value having been calculated based at least in part on a total of the items in the first content.

5. The computer-implemented method of claim 1, further comprising causing an alert to be sent upon the first digital asset being stored in the blockchain, the alert being a notification to the first entity and the second entity that the first digital asset is viewable in the blockchain.

6. The computer-implemented method of claim 5, wherein:
   the alert further comprises an identity of the first entity, in response to the identity of the first entity being anonymized in the first digital asset stored in the blockchain; and
   the alert is sent to a plurality of entities for a reply, the second entity being a first to reply with an approval of the first digital asset, the approval of the first digital asset being stored in the blockchain.

7. The computer-implemented method of claim 1, further comprising causing an alert to be sent upon the second digital asset being stored in the blockchain, the alert being a notification to the first entity, the second entity, and a third entity that the second digital asset is viewable in the blockchain;
- wherein the computer system receives the third digital asset of the third entity, in response to the third entity satisfying the requirement for the second digital asset on behalf of the first entity.

8. A system comprising:
- a memory having computer readable instructions; and
- one or more processors for executing the computer readable instructions, the computer readable instructions controlling the one or more processors to perform operations comprising:
  - receiving a first digital asset of a first entity;
  - storing the first digital asset in a blockchain, in response to checking that a first electronic option is selected for storing the first digital asset in the blockchain;
  - receiving a second digital asset of a second entity, the second digital asset being based at least in part on having satisfied the first digital asset;
  - validating that a first content of the first digital asset is in agreement with a second content of the second digital asset;
  - storing the second digital asset in the blockchain, in response to checking that a second electronic option is selected for storing the second digital asset in the blockchain and in response to the first content being in agreement with the second content; and
  - receiving a third digital asset on behalf of the first entity, in response to the first digital asset and the second digital asset being available in the blockchain, the third digital asset being an indication that a requirement is satisfied for the second digital asset on behalf of the first entity.

9. The system of claim 8, wherein the first digital asset is an electronic request.

10. The system of claim 8, wherein the second digital asset is an indication of fulfillment of an electronic request of the first digital asset.

11. The system of claim 8, wherein validating that the first content of the first digital asset is in agreement with the second content of the second digital asset comprises:
- parsing first fields in the first content identify a same description of items second fields in the second content; and
- determining that a value is accurate in the second fields in the second content, the value having been calculated based at least in part on a total of the items in the first content.

12. The system of claim 8, further comprising causing an alert to be sent upon the first digital asset being stored in the blockchain, the alert being a notification to the first entity and the second entity that the first digital asset is viewable in the blockchain.

13. The system of claim 12, wherein:
- the alert further comprises an identity of the first entity, in response to the identity of the first entity being anonymized in the first digital asset stored in the blockchain; and
- the alert is sent to a plurality of entities for a reply, the second entity being a first to reply with an approval of the first digital asset, the approval of the first digital asset being stored in the blockchain.

14. The system of claim 8, further comprising causing an alert to be sent upon the second digital asset being stored in the blockchain, the alert being a notification to the first entity, the second entity, and a third entity that the second digital asset is viewable in the blockchain;
- wherein the one or more processors receive the third digital asset of the third entity, in response to the third entity satisfying the requirement for the second digital asset on behalf of the first entity.

15. A computer program product comprising a computer readable storage medium having program instructions embodied therewith, the program instructions executable by one or more processors to cause the one or more processors to perform operations comprising:
- receiving a first digital asset of a first entity;
- storing the first digital asset in a blockchain, in response to checking that a first electronic option is selected for storing the first digital asset in the blockchain;
- receiving a second digital asset of a second entity, the second digital asset being based at least in part on having satisfied the first digital asset;
- validating that a first content of the first digital asset is in agreement with a second content of the second digital asset;
- storing the second digital asset in the blockchain, in response to checking that a second electronic option is selected for storing the second digital asset in the blockchain and in response to the first content being in agreement with the second content; and
- receiving a third digital asset on behalf of the first entity, in response to the first digital asset and the second digital asset being available in the blockchain, the third digital asset being an indication that a requirement is satisfied for the second digital asset on behalf of the first entity.

16. The computer program product of claim 15, wherein the first digital asset is an electronic request.

17. The computer program product of claim 15, wherein the second digital asset is an indication of fulfillment of an electronic request of the first digital asset.

18. The computer program product of claim 15, wherein validating that the first content of the first digital asset is in agreement with the second content of the second digital asset comprises:
- parsing first fields in the first content identify a same description of items second fields in the second content; and
- determining that a value is accurate in the second fields in the second content, the value having been calculated based at least in part on a total of the items in the first content.

19. The computer program product of claim 15, further comprising causing an alert to be sent upon the first digital asset being stored in the blockchain, the alert being a notification to the first entity and the second entity that the first digital asset is viewable in the blockchain.

20. The computer program product of claim 19, wherein:
- the alert further comprises an identity of the first entity, in response to the identity of the first entity being anonymized in the first digital asset stored in the blockchain; and
- the alert is sent to a plurality of entities for a reply, the second entity being a first to reply with an approval of the first digital asset, the approval of the first digital asset being stored in the blockchain.

* * * * *